(12) United States Patent
Cowelchuk et al.

(10) Patent No.: US 7,063,369 B2
(45) Date of Patent: Jun. 20, 2006

(54) AUTOMOTIVE INSTRUMENT PANEL

(75) Inventors: Glenn A. Cowelchuk, Chesterfield Township, MI (US); Todd L. DePue, Brighton, MI (US)

(73) Assignee: Lear Corporation, Southfield, MI (US)

( * ) Notice: Subject to any disclaimer, the term of this patent is extended or adjusted under 35 U.S.C. 154(b) by 36 days.

(21) Appl. No.: 10/708,528

(22) Filed: Mar. 10, 2004

(65) Prior Publication Data

US 2005/0200152 A1    Sep. 15, 2005

(51) Int. Cl.
*B62D 25/14* (2006.01)
(52) U.S. Cl. .......................... 296/70; 296/74
(58) Field of Classification Search ................. 296/70, 296/74; 180/90
See application file for complete search history.

(56) References Cited

U.S. PATENT DOCUMENTS

| 4,350,383 | A | * | 9/1982 | Kikuta | 296/72 |
| 4,714,575 | A | | 12/1987 | Preston | 264/46.4 |
| 4,943,107 | A | * | 7/1990 | Rhodes, Jr. | 296/70 |
| 5,294,164 | A | * | 3/1994 | Shimabara et al. | 296/72 |
| 5,500,169 | A | | 3/1996 | Kondo et al. | 264/46.5 |
| 5,618,477 | A | | 4/1997 | Suzuki | 264/46.5 |
| 5,709,828 | A | | 1/1998 | Bemis et al. | 264/46.5 |
| 5,736,082 | A | | 4/1998 | Funato et al. | 264/46.5 |
| 5,976,289 | A | | 11/1999 | Kawakubo et al. | 156/78 |
| 6,251,320 | B1 | | 6/2001 | Hansel et al. | 264/46.1 |
| 2003/0201571 | A1 | | 10/2003 | Davis, Jr. et al. | 264/255 |

* cited by examiner

*Primary Examiner*—Joseph D. Pape
(74) *Attorney, Agent, or Firm*—Wood Herron & Evans, LLP

(57) ABSTRACT

An instrument panel for an automobile that eliminates the gaps between the lateral ends of the instrument panel and adjacent door panels, when the doors of the automobile are in their closed positions. In one embodiment, the instrument panel includes a rigid substrate and a pliable cover layer that extends beyond lateral ends of the substrate to form flexible flanges. The flexible flanges contact the door panels when the doors are closed, and deform toward the substrate so as not to interfere with the closing of the doors. In another embodiment, the substrate includes central and lateral sections connected by the pliable cover layer. As the doors of the automobile are closed, the lateral substrate sections contact the door panels and are deformed toward to central substrate section.

10 Claims, 2 Drawing Sheets

AUTOMOTIVE INSTRUMENT PANEL

FIELD OF THE INVENTION

The present invention pertains generally to automotive interior trim components, and more particularly to an instrument panel for an automobile.

BACKGROUND OF THE INVENTION

It is known to outfit automotive interiors with various trim components to enhance the aesthetic appearance of the automotive interior and to provide comfort and convenience to vehicle occupants. For example, automotive interiors are typically provided with door trim panels, instrument panels and console cover panels. The instrument panel is provided in a portion of the passenger compartment, at a position forward of the vehicle occupants and disposed laterally between the door panels. Typically, automotive manufacturers strive to provide a clearance between the ends of the instrument panel and the adjacent door panels to avoid interference between these components and thereby facilitate easy closing of the automobile doors. The smallest gap between the instrument panel and an adjacent door panel has been about 5 mm. While these gaps avoid interference due to the cumulative effect of tolerance variations in the assembled components in the automobile, they also detract from the aesthetic appearance of the trim components. A need therefore exists for an automotive instrument panel which eliminates the gap between the instrument panel and an adjacent door panel to further improve the aesthetic appearance of the interior trim.

SUMMARY OF INVENTION

The present invention provides an instrument panel that eliminates the gaps between lateral ends of the instrument panel and adjacent door panels of an automobile in which the instrument panel is installed, when the doors are in their closed positions. The instrument panel includes a substrate member that defines the general shape of the instrument panel, and a pliable cover layer disposed over the substrate member. The substrate has lateral end portions configured to confront respective portions of the door panels located adjacent lateral ends of the instrument panel. The substrate member and cover layer together define resilient engagement areas at the lateral ends of the instrument panel which contact the adjacent door panels and which deform when the doors are moved to their closed positions such that proper closing of the doors is not inhibited by the contact.

In one embodiment, the pliable cover layer extends beyond the lateral end portions of the substrate member to define flexible flanges for engaging the door panels. When the doors of the automobile are moved to their respective closed positions, the flanges deform to accommodate the respective door panels.

In another embodiment, the substrate member includes a central substrate section and lateral substrate sections disposed on respective lateral ends of the central substrate section. The lateral substrate sections are spaced from the central substrate section and are flexibly connected to the central substrate section by the pliable cover layer. When the doors of the automobile are moved to their closed positions, the lateral substrate sections contact the respective door panels and deform toward the central substrate section to accommodate the door panels.

In another embodiment, a method of finishing an interior of an automobile includes installing an instrument panel having lateral ends that define resilient engagement areas, contacting a door panel of the automobile with the instrument panel, proximate the resilient engagement areas when the door panel is moved to a closed position, and deforming the instrument panel to accommodate the door panel.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
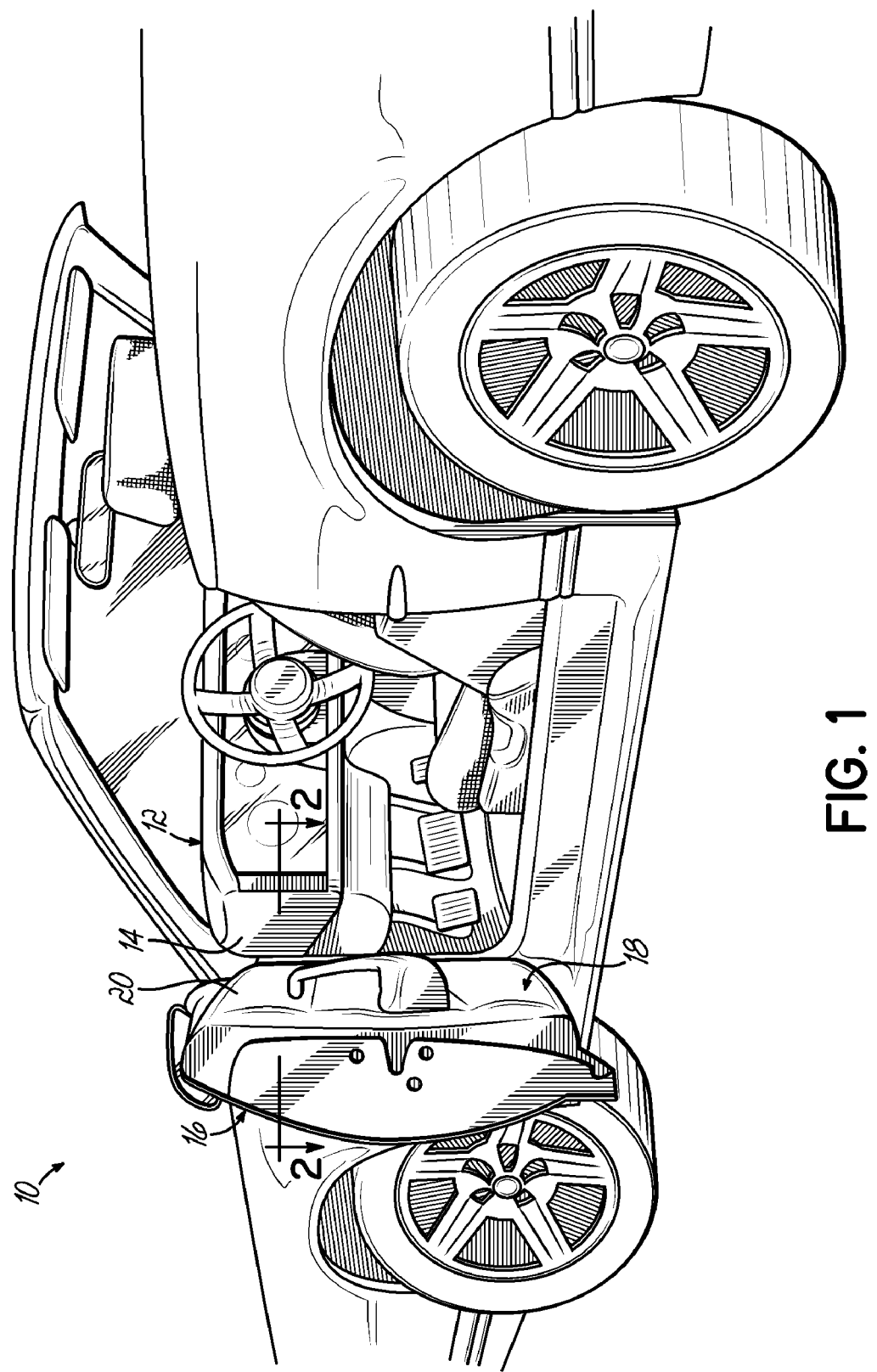
FIG. 1 is a perspective view of a typical automotive installation including an exemplary instrument panel according to the present invention.
Figure 2A:
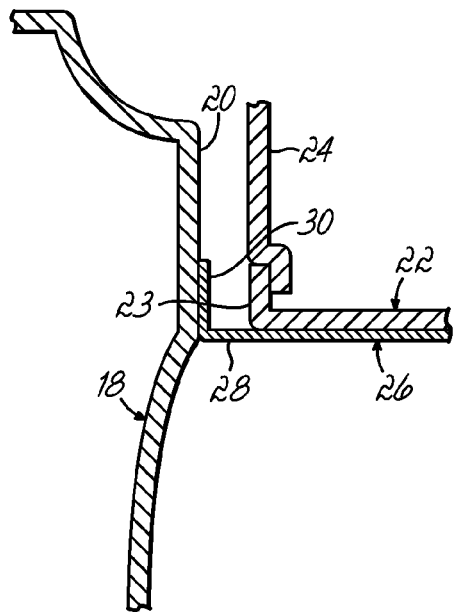
FIG. 2A is a partial cross-sectional view taken along line 2—2 of FIG. 1 and depicting one embodiment of an instrument panel according to the present invention.

Referring to FIG. 1, there is shown a typical automobile 10 including an exemplary instrument panel 12 according to the present invention. The instrument panel 12 is installed in a forward portion of the passenger compartment of the automobile 10, and has opposed lateral ends 14 (one of which is shown in FIG. 1). The automobile 10 further includes a door 16 hingedly secured to the automobile 10 for movement between open and closed positions, as known in the art. The door 16 includes an interior door panel 18, a portion of which (designated at 20) confronts the lateral end 14 of the instrument panel when the door 16 is in the closed position. While only one door 16 and lateral end 14 of instrument panel 12 is shown in FIG. 1, it will be understood that another door 16 and another lateral end 14 are provided on the opposite side of the automobile 10, as known in the art. Referring now to FIG. 2A, there is shown a partial cross-sectional view of the lateral end 14 of the instrument panel 12 and the door panel 18 when the door 16 is in the closed position. As shown in FIG. 2A, instrument panel 12 includes a substrate member 22 which defines the general shape of the instrument panel 12 and which may be secured within the interior of the automobile 10, for example, to a bracket or mounting member 24. The instrument panel 12 further includes a pliable cover layer 26 disposed over the substrate member 22 to provide an aesthetically pleasing appearance to the instrument panel 12. In the embodiment shown in FIG. 2A, the cover layer 26 extends beyond the lateral end portion 23 of the substrate 22 to define a flexible flange 28 that contacts the door panel 18 adjacent the confronting area 20 when the door panel 18 is in the closed position. A distal end 30 of the flange 28 is formed at an angle so that door panel 18 contacts a side surface of the flange 28 in the closed position.

Advantageously, the flange 28 is displaced toward the substrate member 22 when the door panel 18 is moved to the closed position to accommodate variation in the spacing between the door panel 18 and the substrate member 22, which may be due to the accumulation of tolerance variations of the assembled automotive components, or to variation in the relative position of the components which may occur over the life of the automobile.

Figure 2B:
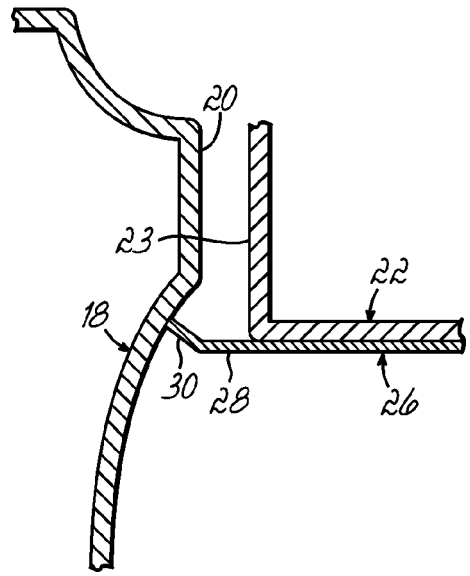
FIG. 2B is a partial cross-sectional view, similar to FIG. 2A, depicting another embodiment of an instrument panel according to the present invention.

Referring now to FIG. 2B, there is shown another embodiment of an instrument panel 12 according to the present invention. In this embodiment, the flange 28 includes a distal end 30 which is angled toward substrate member 22 such that door panel 18 contacts an edge of the flange 28 in the closed position. Accordingly, the angled distal end 30 facilitates flexing of the flange 28 when door panel 18 is moved to the closed position to thereby provide contact with the door panel 18 without inhibiting closing of the door 16.

Figure 2C:
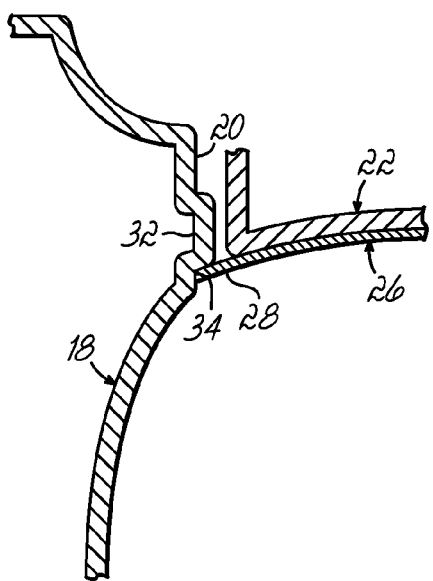
FIG. 2C is a partial cross-sectional view, similar to FIG. 2A, depicting yet another embodiment of an instrument panel according to the present invention.
Figure 2D:
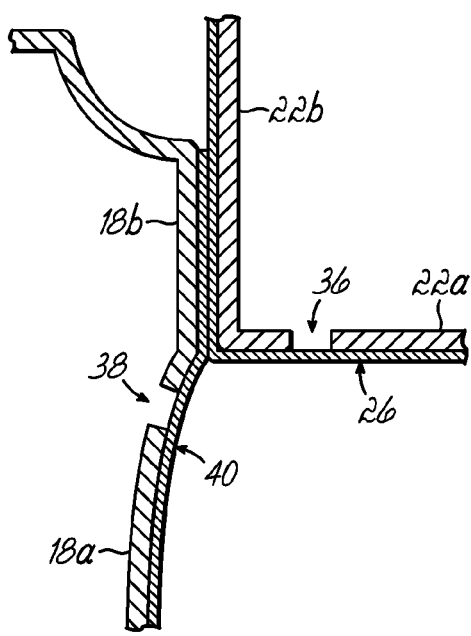
FIG. 2D is a partial cross-sectional view, similar to FIG. 2A, depicting yet another embodiment of an instrument panel according to the present invention.

Referring now to FIG. 2C, there is shown yet another embodiment of the instrument panel 12 wherein a flange 28 defined by outwardly extending cover layer 26 does not have an angled distal end. In this embodiment, door panel 18 is configured to include a laterally extending boss 32 which faces the lateral end 14 of the instrument panel 12, and a groove 34 adjacent the boss 32 and positioned to received the flange 28 of the instrument panel 12 when the door panel 18 is in the closed position. Referring now to FIG. 2D, there is shown yet another embodiment of an instrument panel 12 and a door panel 18 according to the present invention. In this embodiment, instrument panel 12 includes a central substrate section 22a and first and second lateral substrate sections 22b separated by a space 36. Only one lateral substrate section 22a is shown in FIG. 2D, it being understood that another similar substrate section 22a is provided at the opposite lateral end 14 of the instrument panel 12.

The central substrate section 22a and first and second lateral substrate sections 22b are flexibly connected by the cover layer 26 which extends over the space 36. When door panel 18 is moved to the closed position, the instrument panel 12 contacts the confronting area 20 of door panel 18 and the lateral substrate section 22b is displaced in a direction toward the central substrate section 22a to facilitate closing of the door 16. In this embodiment, door panel 18 may also comprise first and second door substrate members 18a, 18b having a space 38 therebetween and connected by a second, pliable cover layer 40 disposed over the first and second door substrate members 18a, 18b and across the space 38. Advantageously, the second door substrate section 18b may also be displaced, generally in a direction opposite the lateral substrate section 22b, when door panel 18 is moved to a closed position. While this embodiment depicts both the instrument panel 12 and door panel 18 configured to accommodate contact between the instrument panel 12 and door panel 18, it will be recognized that the instrument panel 12 may alternatively be a conventional instrument panel, without lateral substrate sections 22b or flexible flanges 28, whereby contact between the instrument panel 12 and door panel 18 is accommodated solely by the second door substrate section 18b and second cover layer 40.

In another embodiment, the substrate member 22 of the instrument panel 12, the first and second door substrate sections 18a, 18b, and the first and second cover layers 26, 40 may be formed from injection moldable polymers. For example, substrate members 22, 18 may be formed from thermoplastic olefin, acrylonitrile butadiene styrene, styrene maleic anhydride, polycarbonate/acrylonitrile butadiene styrene alloy, or other materials suitable for molding a rigid substrate member. The flexible cover layers 26, 40 may be formed from vinyl, thermoplastic elastomer, PVC, or other suitable materials for molding the flexible cover layers 26, 40. Alternatively, the cover layers 26 may be formed from fabric or leather and fitted over the molded substrate member 22, 18a, 18b, as known in the art. Advantageously, the instrument panel 12 and door panel 18 of the present invention may be formed in a two-shot molding operation wherein the substrate members 22, 22a, 22b, 18a, 18b are formed during a first shot of the molding process, and the cover layers 26, 40 are molded over the substrate members 22, 22a, 22b, 18a, 18b during a second shot of the molding operation.

In another embodiment of the invention, a method of finishing an interior of an automobile 10 includes installing an instrument panel 12, as described above, within the interior of the automobile 10 and between laterally opposed door panels 18, contacting the door panels 18 with the instrument panel 12, adjacent the lateral ends 14 of the instrument panel 12 when the doors 16 are in their closed positions, and displacing at least a part of the instrument panel 18 to accommodate the door panels 18 in their closed positions.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants" general inventive concept.

What is claimed is:

1. An automotive instrument panel, comprising:
a substrate member defining the general shape of the instrument panel and having lateral end portions configured to confront respective portions of adjacent door panels of an automobile in which the instrument panel is to be used; and
a pliable cover layer disposed on said substrate member;
said cover layer defining resilient engagement areas proximate said lateral end portions of said substrate member which contact the adjacent door panels when the door panels are in closed positions;
wherein said cover layer includes free ends extending outwardly from said lateral end portions of said substrate member to define respective flexible flanges cantilevered from said substrate member and contacting the respective door panels in the closed positions.

2. The instrument panel of claim 1, wherein said flexible flanges have angled distal ends for engaging the door panels.

3. The instrument panel of claim 2, wherein said distal ends are angled such that the door panels contact side surfaces of said flanges in the closed positions.

4. The instrument panel of claim 2, wherein said distal ends are angled such that the door panels contact end edges of said flanges in the closed positions.

5. The instrument panel of claim 1, wherein said cover layer deforms to accommodate the door panels in their closed positions.

6. The instrument panel of claim 1, wherein said substrate member and said cover layer are formed from injection moldable polymers, and said pliable cover layer is molded over said substrate member.

7. An automotive interior trim assembly, comprising:
- an instrument panel Including a substrate member defining the general shape of the instrument panel and having opposed lateral ends, said instrument panel further including a pliable, first cover layer disposed on said substrate member and having free ends extending outwardly from said lateral ends of said substrate member to define respective flexible flanges cantilevered from said substrate member;
- a door panel hingedly secured adjacent said instrument panel, proximate one of said lateral ends of said substrate member, for movement between open and closed positions; and
- said door panel contacting said instrument panel at one of said flexible flanges when said door panel is in said closed position.

8. The trim assembly of claim 7, wherein said flexible flanges deform to accommodate said door panel in said closed position.

9. A method of finishing an interior of an automobile, comprising:
- installing an instrument panel within the interior of the automobile between laterally opposed door panels of the automobile, the instrument panel including a rigid substrate member having lateral ends, and a pliable cover layer disposed over the substrate member, the cover layer including free ends extending outwardly from the lateral ends of the substrate member to define respective flexible flanges cantilevered from the substrate member;
- contacting a doer panel of the automobile with the instrument panel, adjacent a lateral end of the substrate member, when the door panel is in a closed position; and
- displacing part of the instrument panel to accommodate the door panel.

10. The method of claim 9, wherein displacing the instrument panel includes deforming the flexible flanges.

* * * * *

UNITED STATES PATENT AND TRADEMARK OFFICE
CERTIFICATE OF CORRECTION

| | | |
|---|---|---|
| PATENT NO. | : 7,063,369 B2 | Page 1 of 1 |
| APPLICATION NO. | : 10/708528 | |
| DATED | : June 20, 2006 | |
| INVENTOR(S) | : Glenn A. Cowelchuk et al. | |

It is certified that error appears in the above-identified patent and that said Letters Patent is hereby corrected as shown below:

Column 5

Line 6, change "Including" to --including--.

Column 6

Line 12, change "doer" to --door--.

Signed and Sealed this

Third Day of October, 2006

JON W. DUDAS
*Director of the United States Patent and Trademark Office*